US006708580B1

(12) United States Patent

Smith et al.

(10) Patent No.: US 6,708,580 B1
(45) Date of Patent: Mar. 23, 2004

(54) DEVICE FOR CONTROLLING AN APPARATUS

(75) Inventors: Kenneth Smith, Boblingen (DE); Jorg Henle, Weikersheim (DE)

(73) Assignee: Wittenstein GmbH & Co. KG, Igersheim (DE)

( * ) Notice: Subject to any disclaimer, the term of this patent is extended or adjusted under 35 U.S.C. 154(b) by 0 days.

(21) Appl. No.: 10/009,185

(22) PCT Filed: Jun. 6, 2000

(86) PCT No.: PCT/EP00/05134

§ 371 (c)(1), (2), (4) Date: Feb. 28, 2002

(87) PCT Pub. No.: WO00/77589

PCT Pub. Date: Dec. 21, 2000

(30) Foreign Application Priority Data

Jun. 11, 1999 (DE) ........................................ 199 26 784

(51) Int. Cl.[7] ......................... G05G 13/00; B60K 17/04

(52) U.S. Cl. ............................... 74/471 XY; 74/473.12

(58) Field of Search ....................... 74/471 XY, 473.12, 74/471 R, 473.33, 473.34, 473.35

(56) References Cited

U.S. PATENT DOCUMENTS

| | | | | |
|---|---|---|---|---|
| 3,776,058 A | * 12/1973 | French | .................. | 74/471 XY |
| 4,704,798 A | * 11/1987 | Hird | ............................ | 33/763 |
| 6,064,369 A | * 5/2000 | Okabe et al. | ............... | 345/161 |
| 6,128,971 A | * 10/2000 | Papasideris | ............ | 74/471 XY |
| 6,311,577 B1 | * 11/2001 | Worner et al. | ........... | 74/473.21 |
| 6,429,849 B1 | * 8/2002 | An et al. | .................... | 345/161 |

* cited by examiner

*Primary Examiner*—David Fenstermacher
(74) *Attorney, Agent, or Firm*—Bachman & LaPointe, P.C.

(57) ABSTRACT

The invention relates to a device for controlling an apparatus, for example an aircraft, an aircraft simulator, a robot or the like. Said device comprises a handle which can be rotated about two axes (A, B) that are perpendicular to one another. The handle pivots about a fulcrum (P) which substantially corresponds to a point of intersection (S) of the axes (A, B).

10 Claims, 7 Drawing Sheets

DEVICE FOR CONTROLLING AN APPARATUS

The present invention relates to an arrangement for controlling an apparatus, such as, for example, an aircraft, aircraft simulator, robot or the like, having a handle which can be moved about two axes which are perpendicular to one another.

Such arrangements are known and are common on the market in a wide variety of forms and designs. They serve primarily to control an aircraft, flight simulator, robot or the like.

In this case, a handle is pivotable essentially about two axes in order to control a corresponding apparatus.

A disadvantage with conventional arrangements is that they are of exceptionally large and complex design if they are fitted, for example, with drive motors for the two corresponding motion axes in order to follow up and/or control a movement of the handle. In addition, these devices are of a construction which is far too complex and expensive, so that they are only used and applied to a limited extent.

An arrangement for controlling liquid transport apparatuses is described according to WO 81/02208. This arrangement has a control column which is movable about two axes offset from one another.

U.S. Pat. No. 4,520,355 describes a joystick which is provided with a multiplicity of potentiometers in the respective axes in order to produce a signal via a corresponding angle of rotation. EP 0 151 479 describes a joystick to which strain gages are assigned. If the joystick is moved, the strain gages produce signals which can be displayed on a screen.

U.S. Pat. No. 4,772,836 discloses a motorized, electrically described control apparatus for stabilized weapons in a tank, in particular for moving tubes of automatic cannons of tanks. In this case, a movement of a control column is braked via externally adjoining motors.

The object of the present invention is to provide an arrangement of the type mentioned at the beginning which removes said disadvantages and with which an arrangement for the exact control of all types of apparatus is possible in a simple and cost-effective manner.

This object is achieved by virtue of the fact that the handle is mounted about a pivot which corresponds to an intersection of the axes, one guide element being mounted in a housing, and a holding arm arranged at an angle being provided outside the housing eccentrically to the axis, and the first guide element being mounted relative to the housing on one side via bearing elements in such a way as to be rotatable about the axis.

In the present invention, it is important that a handle for controlling the apparatus about two axes which are perpendicular to one another is possible at any time. In this case, exact control and movement of the handle is to be possible.

It has proved to be especially favorable to place the pivot of the handle at the intersection of the two axes in order to ensure an exact movement of the handle relative to the axes.

In order to reduce the installation size of the arrangement according to the invention, a holding arm adjoins a guide element, a further guide element on which the handle also sits being mounted perpendicularly to the axis on this holding arm in such a way as to be rotatable about the axis.

Appropriate force sensors connected to the handle and/or to the guide element can influence the movement of the guide elements.

If a force is measured in a certain direction, a rotary movement is assisted by the corresponding drive device for controlling the apparatus by means of the drive motor.

Furthermore, for example during operation of an autopilot of an aircraft, a corresponding movement of the handle can be indicated and can be followed up by means of the drive devices.

Such an arrangement offers may different possible uses, in particular in aviation and space travel. However, the invention is not to be restricted to this application.

Furthermore, it is also to be possible to use an arrangement according to the invention on any desired apparatuses, flight simulators, robots or the like. For example, exact guidance and control of a robot, for example as an operation aid, is also possible in medical technology.

Furthermore, it is also to be possible for such an arrangement to be used for fun parks, games, with an appropriate force or torque feedback, and also in the field of telemanipulation. There is no limit to the invention in this respect.

Furthermore, appropriate stop elements, arranged separately for each rotary movement about the respective axis, and restraining elements ensure freedom of movement of the two axes independently of one another.

No freedom of movement of the stops of the one axis impairs the freedom of movement of the other axis. Here, separate stop element and restraining elements are provided.

Furthermore, it is advantageous that this ensures a compact, lightweight type of construction with the components of the drive motor, the gear unit and the guide elements, this type of construction having a very low weight overall.

Furthermore, large tilting moments of the guide elements can be absorbed, even in the case of a one-sided bearing arrangement of the guide elements. This especially has advantages during installation, where the installation weight and in particular the installation size are important.

Further advantages, features and details of the invention follow from the description below of preferred exemplary embodiments and with reference to the drawing, in which.

Figure 1:
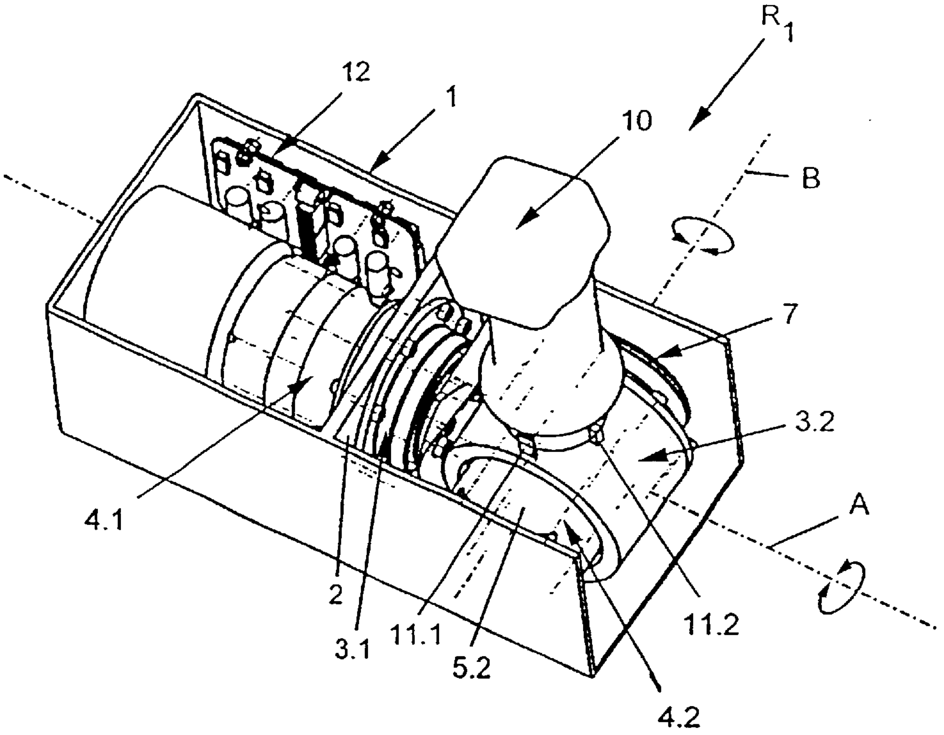
FIG. 1 shows a perspective plan view of an arrangement according to the invention for controlling an apparatus, in a rest position.

According to FIG. 1, an arrangement $R_1$ according to the invention has a housing 1 in which a first guide element 3.1 is arranged on an end wall 2 in such a way as to be rotatable about an axis A.

Figure 3:
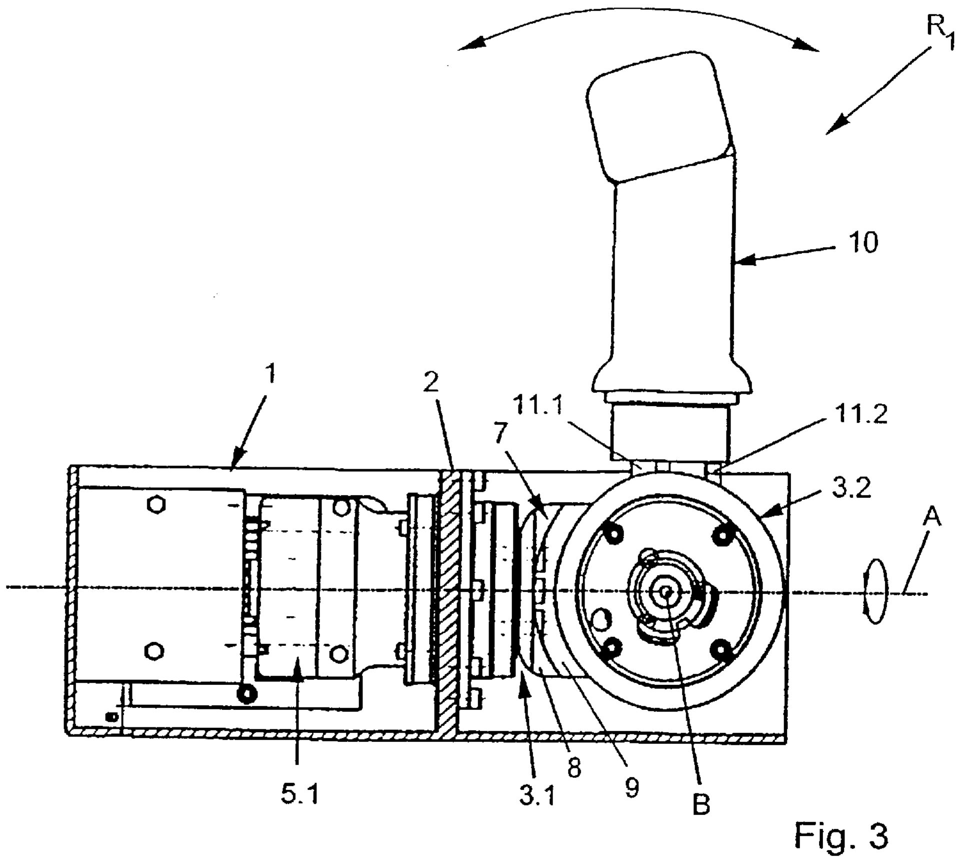
FIG. 3 shows a schematic partial longitudinal section through the arrangement according to FIG. 1.
Figure 4:
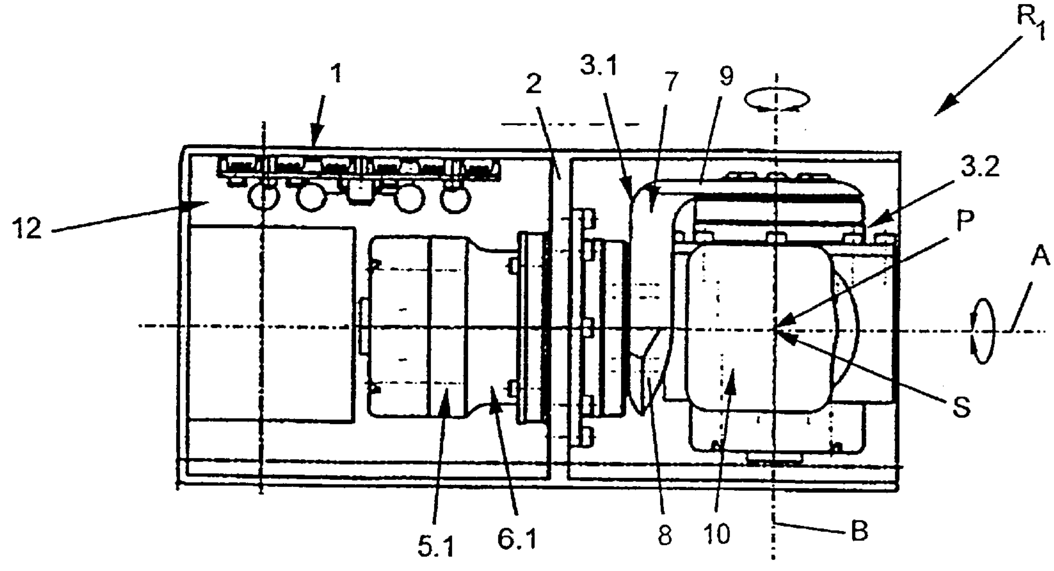
FIG. 4 shows a schematic plan view of the arrangement according to FIG. 1.

The guide element 3.1 is connected to a drive device 4.1, in particular a preferably electrically operated drive motor 5.1 and an adjoining gear unit 6.1, as shown in more detail in FIGS. 3 and 4.

In the preferred exemplary embodiment, the guide element 3.1 has a holding arm 7 which runs out of the axis A at approximately right angles by means of a holding plate 8 and forms a right angle with a locating plate 9 adjoining it at approximately right angles. The locating plate 9 runs approximately parallel to the axis A.

A second guide element 3.2 is mounted on the locating plate 9 preferably at right angles to the axis A, this second guide element 3.2 being mounted in such a way as to be rotatable about the axis B via a second drive device 4.2, in particular a drive motor 5.2.

Located at an intersection S, between the two axes A and B, is the pivot P of a handle 10, which is seated approximately centrally on the second guide element 3.2 so as to project perpendicularly upward.

Figure 2:
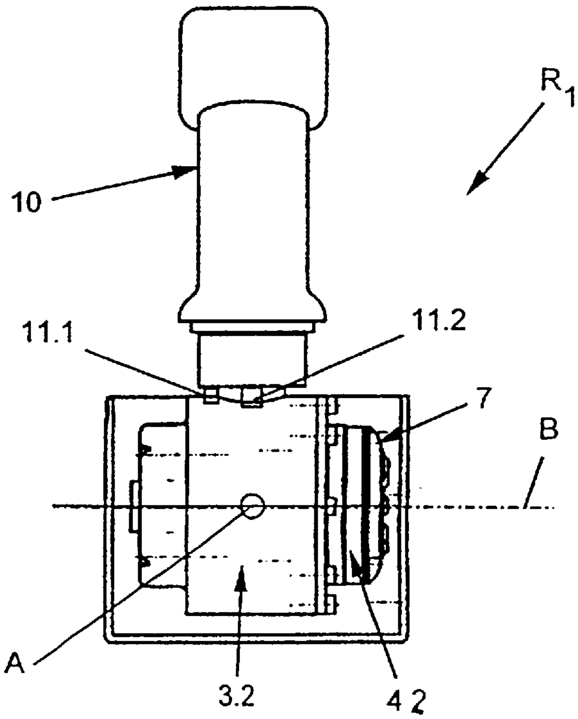
FIG. 2 shows a schematic plan view of the arrangement for controlling an apparatus according to FIG. 1.

At least one force sensor 11.1, 11.2, as shown in particular in FIGS. 1 to 3, may be assigned to the handle 10 and/or the guide element 3.2.

The task of the force sensor 11.1, 11.2, during a manual movement of the handle 10, is to detect a direction of force or movement in order to permit positive driving or also an assisted movement of the handle 10 in the respective desired direction by corresponding rotation of the guide elements 3.1, 3.2 by means of the drive devices 4.1, 4.2.

For this purpose, force sensor 11.1, 11.2 and the drive devices 4.1, 4.2 are connected to a control 12, as is indicated in FIG. 1.

Figure 5:
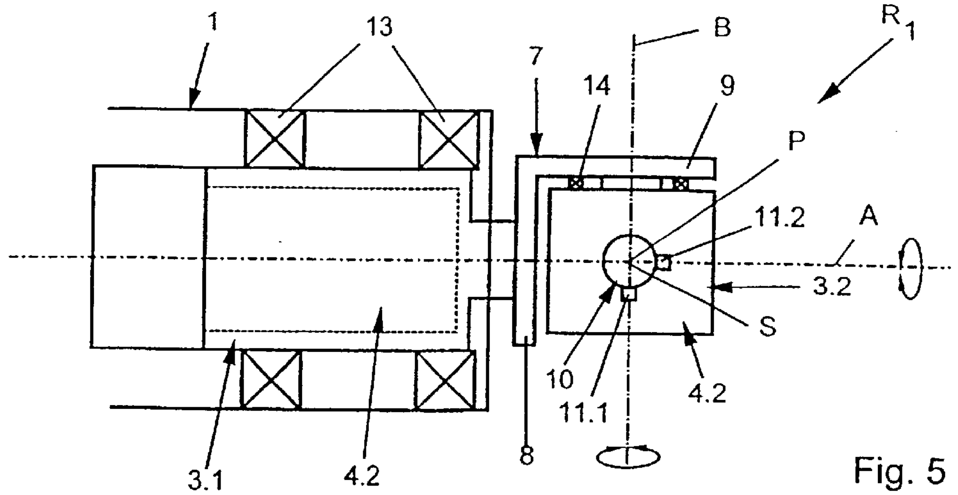
FIG. 5 shows a schematic plan view of the arrangement according to FIG. 1.

In particular, the exemplary embodiment of the present invention according to FIG. 5 shows that the guide element 3.1 is mounted on one side relative to the housing 1 via bearing elements 13.

It is advantageous that very large bearing elements 13 may be used, so that the guide element 3.1 can be mounted on one side relative to the housing 1 in such a way as to be rotatable about the axis A. The bearing elements 13 can absorb large forces.

The holding arm 7 adjoins the guide element 3.1 at an angle as an integral part of the latter. In this case, the holding plate 8 is seated on the guide element 3.1, and the locating plate 9 adjoins this holding plate 8 eccentrically to the axis A and approximately parallel to the axis A. Arranged there are bearing elements 14 which carry the guide element 3.2 in a rotatable and pivotable manner about the axis B.

Figure 6:
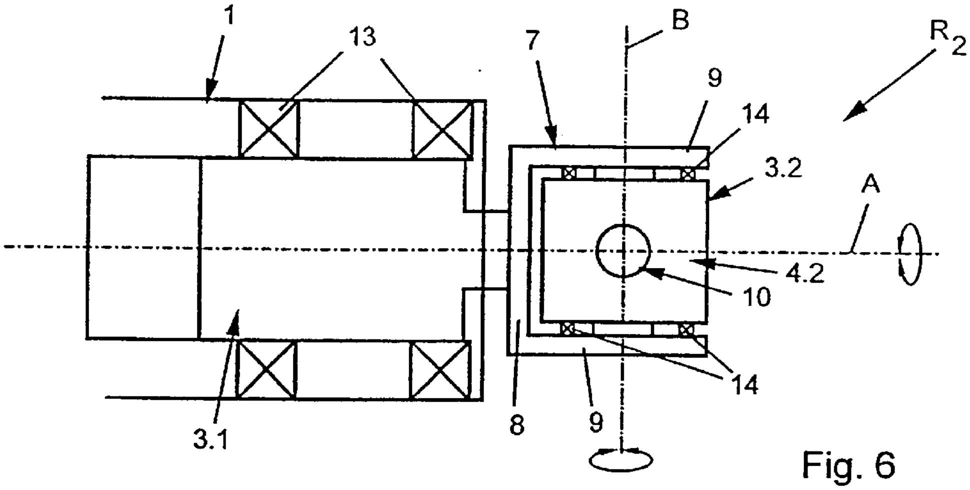
FIG. 6 shows a schematic plan view of the arrangement according to FIG. 5 as a further exemplary embodiment.

In the exemplary embodiment of the present invention according to FIG. 6, an arrangement $R_2$ is shown in which essentially all the above-described components in accordance with FIGS. 1 to 5 are contained. A difference is that the guide element 3.2 with integrated drive device 4.2 is mounted at both ends relative to the holding arm 7 via additional bearing elements 14 in such a way as to be rotatable about the axis B. A two-sided bearing arrangement is realized here. To this end, a further locating plate 9 adjoins the holding plate 8 at the other end.

Figure 7:
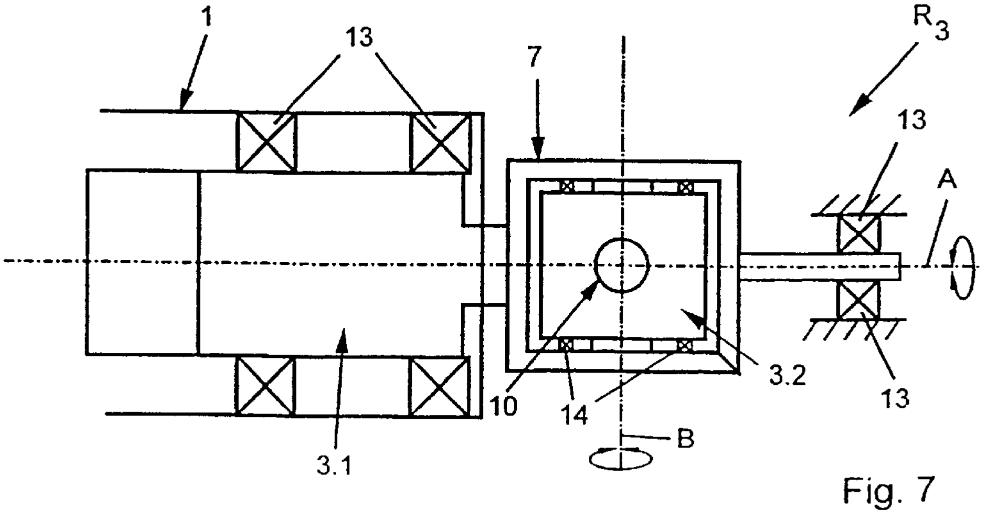
FIG. 7 shows a schematic plan view of the arrangement according to FIG. 5 as a further exemplary embodiment.

In the exemplary embodiment of the present invention according to FIG. 7, an arrangement $R_3$ is shown in which, in accordance with the exemplary embodiment according to FIG. 6, although the guide elements 3.2 are mounted on both sides about the axis B, the holding arm 7 is mounted in such a way as to be rotatable about the axis A not only at one end via the bearing elements 13 but also at the other end via further bearing elements 13, as indicated here schematically. A two-sided bearing arrangement is intended here.

Figure 8:
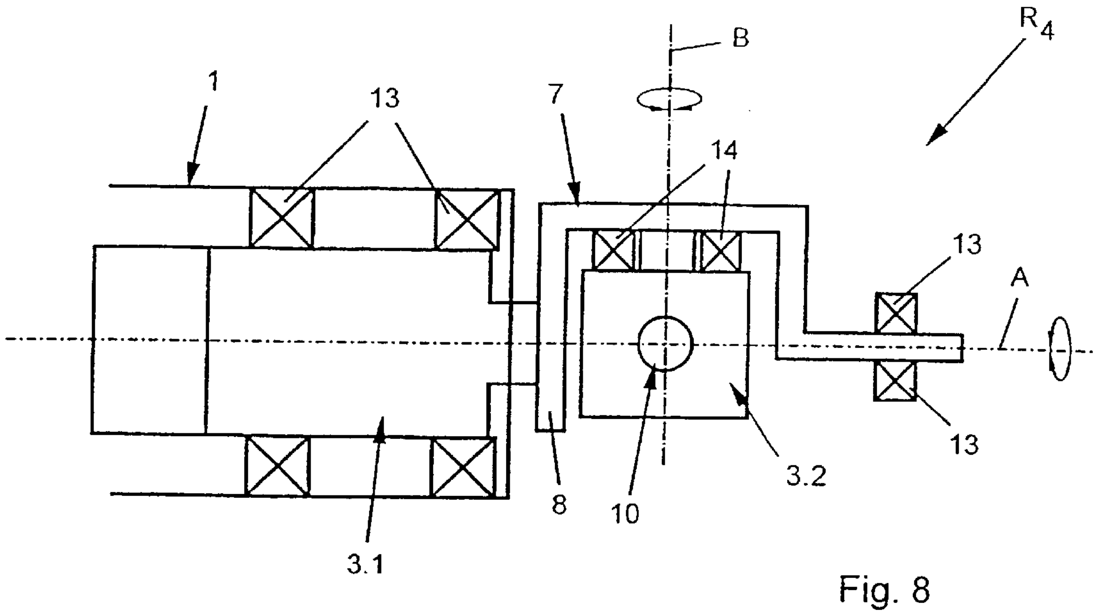
FIG. 8 shows a schematic plan view of a further exemplary embodiment of the arrangement according to FIGS. 5 to 7.

In the exemplary embodiment of the invention according to FIG. 8, an arrangement $R_4$ is shown in which the guide element 3.2, in accordance with the exemplary embodiment of the arrangement $R_1$ according to FIG. 5, is mounted on one side in such a way as to be rotatable about the axis B.

Adjoining the guide element 3.1, the holding arm 7 is mounted on both sides via the further bearing elements 13 in such a way as to be rotatable about the axis A, as indicated schematically. This type of bearing arrangement is also to be included by the present idea of the invention.

Figure 9:
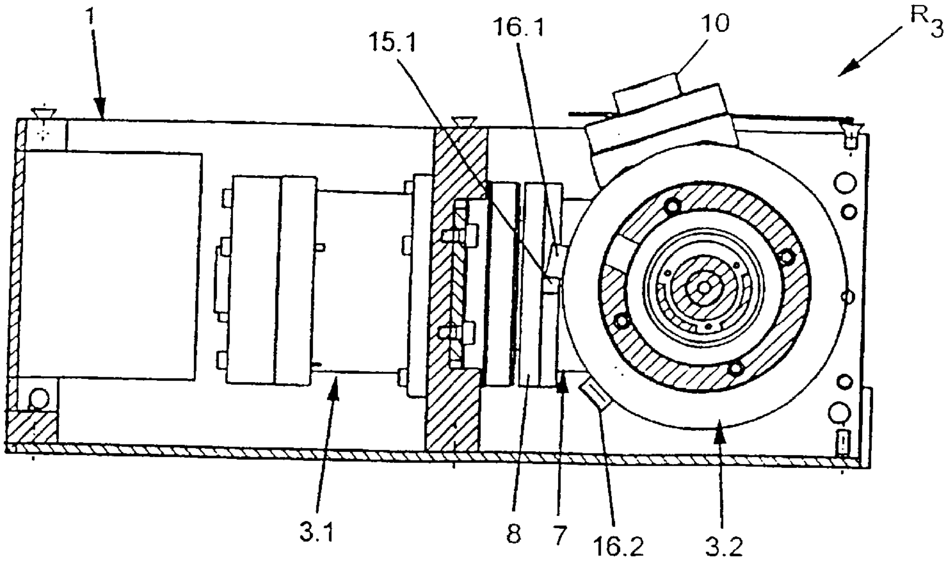
FIG. 9 shows a schematic side view of the arrangement according to FIG. 1 with a stop element.
Figure 10:
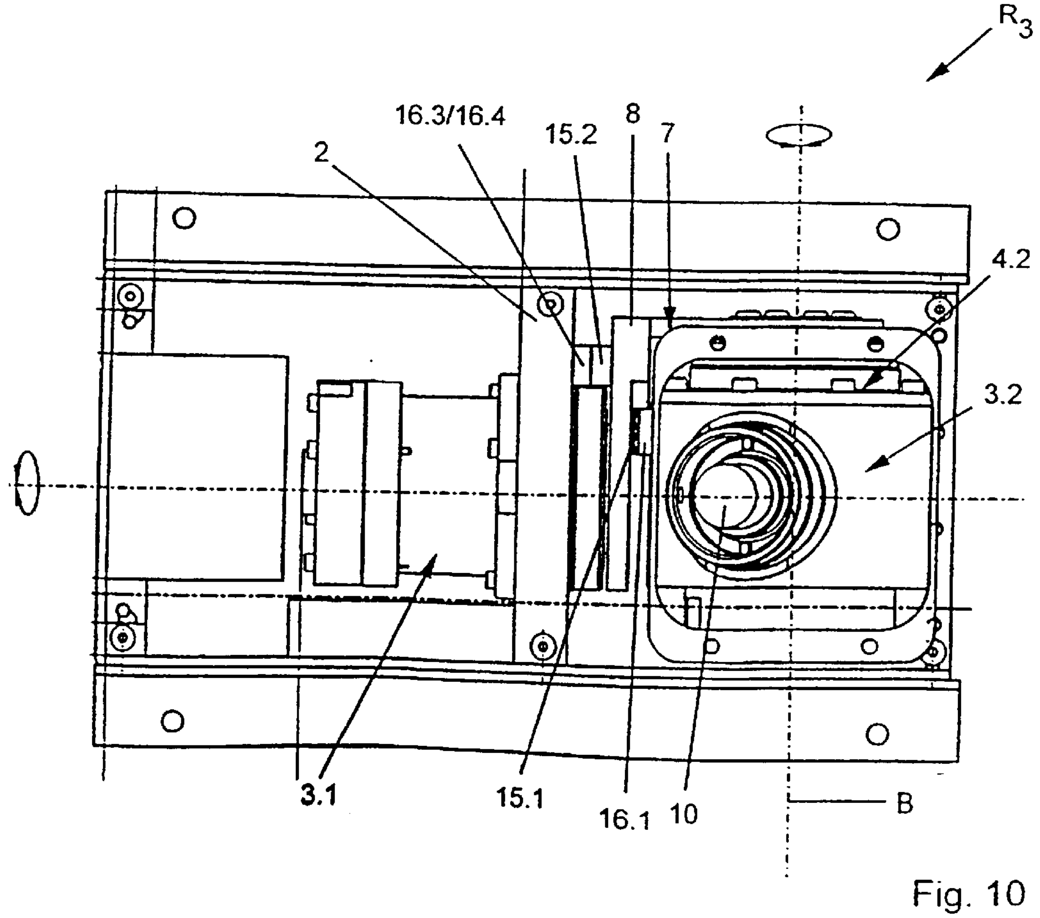
FIG. 10 shows a schematic plan view of the arrangement according to FIG. 9 with stop element.

In the exemplary embodiment of the present invention according to FIG. 9, an arrangement $R_5$ is shown which essentially corresponds in, its construction to the arrangement according to FIGS. 1 to 4.

A stop element 15.1 is arranged there on the holding plate 8, this stop element 15.1 limiting a rotary movement of the guide element 3.2 with respect to its end positions. Corresponding arresting elements 16.1, 16.2 can limit the movement of the guide element 3.1, 3.2. These arresting elements 16.1, 16.2 adjoin the guide element 3.2 at the end face.

In the corresponding plan view, stop element 15.1 and arresting element 16.1, 16.2 are arranged more or less close to the axis A inside the holding plate 8 of the holding arm 7.

Furthermore, a further stop element 15.2 is preferably secured to the end wall 2 of the housing 1 in order to restrict a direction of movement of the guide element 3.1 about the axis A by means of the two arresting elements 16.3, 16.4 arranged radially on the rear side at the holding plate 8 of the holding arm 7. It is advantageous in the present invention that each direction of movement of the guide elements 3.1, 3.2 either about the axis A or about the axis B is independent and the two stop elements 15.1, 15.2 are not coupled to one another.

Figure 11:
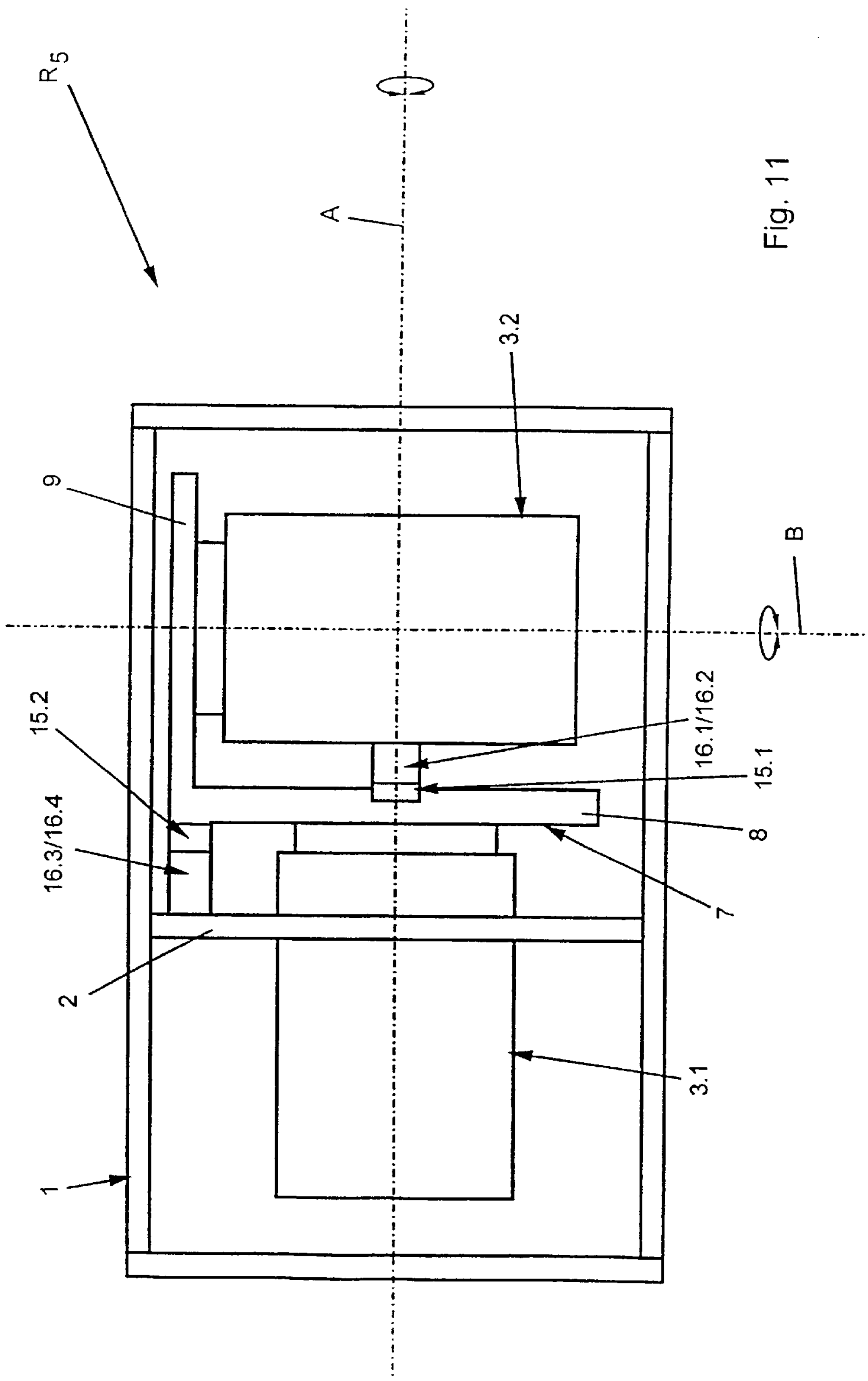
FIG. 11 shows a schematic plan view of the mode of operation of the stop elements relative to two rotatable axes.

In the exemplary embodiment of the present invention according to FIG. 11, the mode of operation of the arrangement $R_5$ is shown schematically as a plan view. The movement of the guide element 3.1 about the axis A can be limited there by the stop element 15.2, which is arranged on the end of the holding plate 8 and/or its locating plate 9, relative to two arresting elements 16.3, 16.4 arranged on the end wall 2 of the housing 1, as also shown in FIG. 12.

In this case, the arresting elements 16.1 to 16.4 may have corresponding adjusting devices in order to accordingly limit an accurate stop.

The arresting elements 16.1 to 16.4 and also the stop elements 15.1, 15.2 may be produced from nylon, metal or materials of that kind, also in combination. It is also intended to dampen the corresponding arresting elements 16.1 to 16.4 in order to dampen an impingement against a stop.

Figure 12:
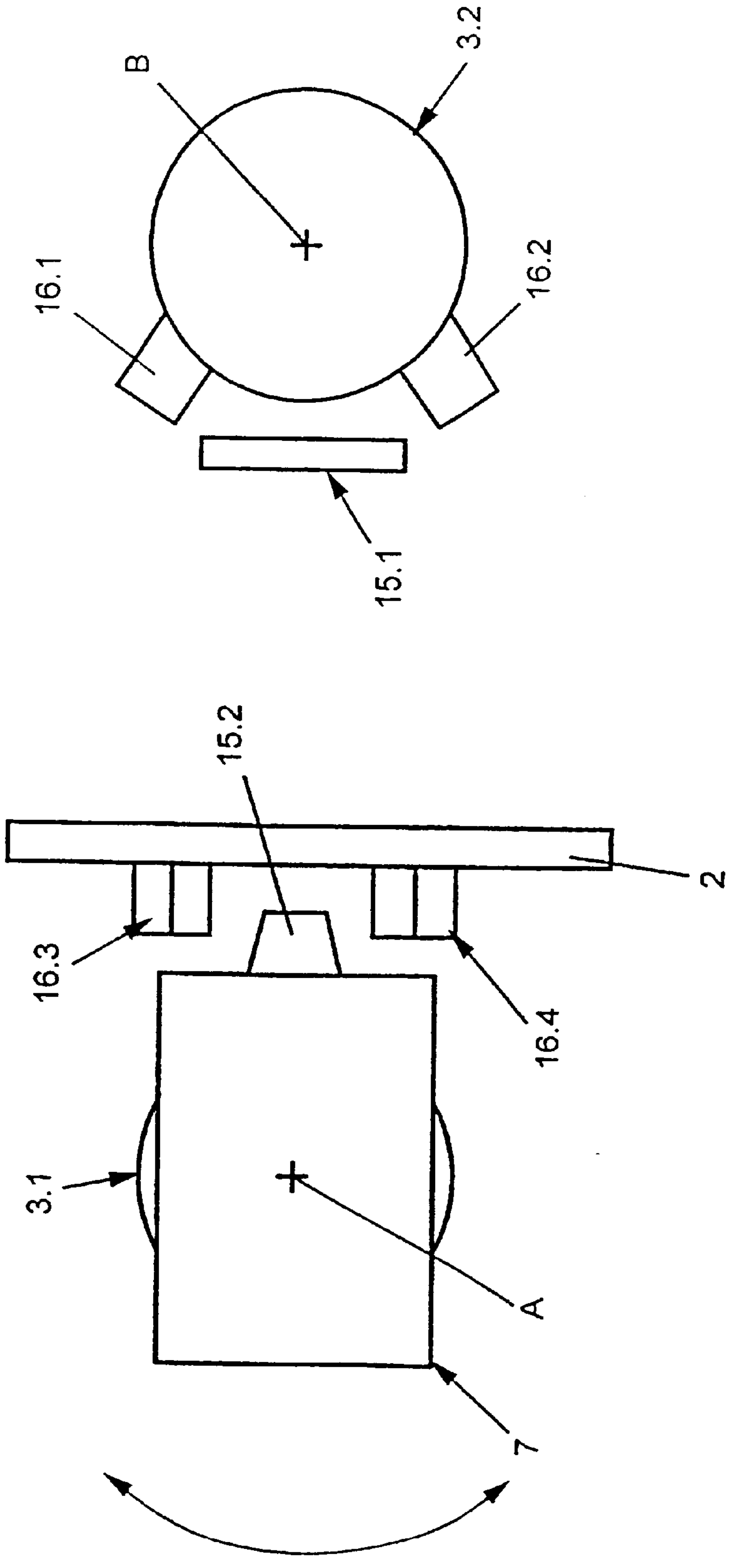
FIG. 12 shows a schematic plan view of the mode of operation of the stop elements and arresting elements on the two rotation axes.

It can also be seen from FIGS. 11 and 12 how the corresponding arresting elements 16.1, 16.2 accordingly limit the rotary movement about the axis B relative to the stop element 15.1.

However, it is important that the rotary movements of the guide elements 3.1, 3.2 about the respective two axes A, B are possible independently of one another by the corresponding arresting elements 16.1 to 16.4 relative to the stop elements 15.1, 15.2.

This ensures universal use of the arrangement $R_5$, so that, for example, when the one guide element bears against a stop element, the other guide element can be actuated without restriction within its rotary range or pivoting range. This is to be included by the present idea of the invention.

PETER WEISS & DIPL.-ING. A. BRECHT
European Patent Attorneys
Reference: P 2300/PCT Date: Jun. 2, 2000

LIST OF ITEM NUMBERS

1 Housing
2 End wall

3 Guide element
4 Drive device
5 Drive motor
6 Gear unit
7 Holding arm
8 Holding plate
9 Locating plate
10 Handle
11 Force sensor
12 Control
13 Bearing element
14 Bearing element
15 Stop element
16 Arresting element
$R_1$ Arrangement
$R_2$ Arrangement
$R_3$ Arrangement
$R_4$ Arrangement
$R_5$ Arrangement
A Axis
B Axis
P Pivot
S Intersection

What is claimed is:

1. A hand controller comprising:

a housing;

a first guide element mounted at least in part on bearing means in the housing for rotation about an axis A;

a holding arm external of the housing and integral with the first guide element, the holding arm comprises a holding plate secured to the first guide element and a locating plate extending from the holding plate in a direction away from the first guide element and eccentric to and parallel to the axis A;

a second guide element mounted for rotation on the locating plate about an axis B which is perpendicular to an intersects with axis A at a point P; and a handle mounted on the second guide element for pivotable movement about point P.

2. A hand controller comprising:

a first guide element mounted for rotation about axis A;

a holding arm integral with the first guide element;

a second guide element mounted on the holding arm for rotation about an axis B which is perpendicular to and intersects with axis A at a point P;

a first drive means for driving the first guide element and a second drive means for driving the second guide element; and a handle mounted on the second guide element for pivotable movement about point P.

3. A hand controller comprising:

a first guide element mounted for rotation about axis A;

a holding arm integral with the first guide element;

a second guide element mounted on the holding arm for rotation about an axis B which is perpendicular to and intersects with axis A at a point P;

a first drive means for driving the first guide element and a second drive means for driving the second guide element; and a handle mounted on the second guide element for pivotable movement about point P; and at least one force sensor associated with the handle for controlling and/or regulating the rotational movement of the first and second guide elements.

4. The controller as claimed in claim 2 or 3, wherein the first and second drive means each comprise a drive motor and a gear unit.

5. The controller as claimed in claim 4, wherein the drive motors, the gear units and the at least one force sensor are connected to a control.

6. The controller as claimed in claim 2 or 3, wherein the second guide element is mounted perpendicularly to the first guide element on the holding arm by bearing elements.

7. The controller as claimed in claim 6, wherein the second guide element is mounted on one side on the holding arm eccentrically to the axis (A) in such a way as to be rotatable about the axis (B).

8. The controller as claimed in claim 2 or 3, wherein the first guide element is mounted in a housing so as to be rotatable about the axis (A).

9. The controller as claimed in any one of claims 1–3, wherein the holding arm is mounted on both sides about the axis (A).

10. The controller as claimed in any one of claims 1–3, wherein the holding arm is of U-shaped design wherein the second guide element is mounted in the holding arm eccentrically to the axis (A) so as to be rotatable about the axis (B).

* * * * *